United States Patent [19]

Sweeney et al.

[11] 3,884,257
[45] May 20, 1975

[54] LINKAGE CONNECTION FOR A HOSE HAULING VEHICLE

[75] Inventors: William T. Sweeney; Gary R. Harris, both of Ponca City, Okla.

[73] Assignee: Continental Oil Company, Ponca City, Okla.

[22] Filed: Apr. 15, 1974

[21] Appl. No.: 460,851

[52] U.S. Cl............ 137/355.16; 137/344; 191/12 R; 302/14
[51] Int. Cl...................... F16l 25/00; F16l 11/04
[58] Field of Search............ 302/11, 14, 69; 299/18, 299/19; 191/12 R, 12.2 S; 137/344, 355.16, 355.17, 355.12; 74/246

[56] References Cited
UNITED STATES PATENTS
3,233,850   2/1966   Merker et al................. 137/344 X Primary Examiner—Henry T. Klinksiek
Attorney, Agent, or Firm—F. Lindsey Scott

[57] ABSTRACT

In an apparatus comprising a hose, a plurality of moveable supports to support the hose, a linkage system for connecting the supports wherein the linkage system comprises a plurality of link members pivotally connected together and to the support members and fasteners for securing the hose to the linkage system, an improvement comprising; positioning in at least one of the link members a union for breaking and rejoining the linkage system.

2 Claims, 6 Drawing Figures 3,884,257

LINKAGE CONNECTION FOR A HOSE HAULING VEHICLE

This invention relates to linkages designed to interconnect a plurality of carts which support a slurry hose system.

U.S. patent application Ser. No. 404,946 entitled "Linkage Geometry for a Slurry System" filed Oct. 10, 1973 by James H. Tarter and David L. McCain discloses a system comprising a flexible, tubular slurry hose supported by a plurality of moveable support means which are interconnected by a linkage comprising a plurality of links pivotally connected together and to the carts. The linkage provides support for the hose and prevents strain on the hose during movement of the slurry system.

A difficulty in the operation of such systems is that it is difficult to readily disassemble and assemble the linkage when the hoses are positioned on the linkage. Accordingly, considerable time and effort has been devoted to the development of an apparatus whereby these difficulties are overcome. It has now been found that these difficulties are minimized in systems comprising a flexible tubular means for conveying a slurry, a plurality of moveable support means to support the tubular means, a linkage means interconnecting the moveable support means, the linkage means comprising a plurality of link members having connecting means at each end and pivotally connected together and to the support members and means for securing the tubular means to the linkage means by an improvement comprising positioning in the linkage means at least one link member having a union means positioned between a first and a second end of the link member for breaking and rejoining the linkage means.

The same numbers will be used throughout the specification for the same or similar parts.

Figure 1:
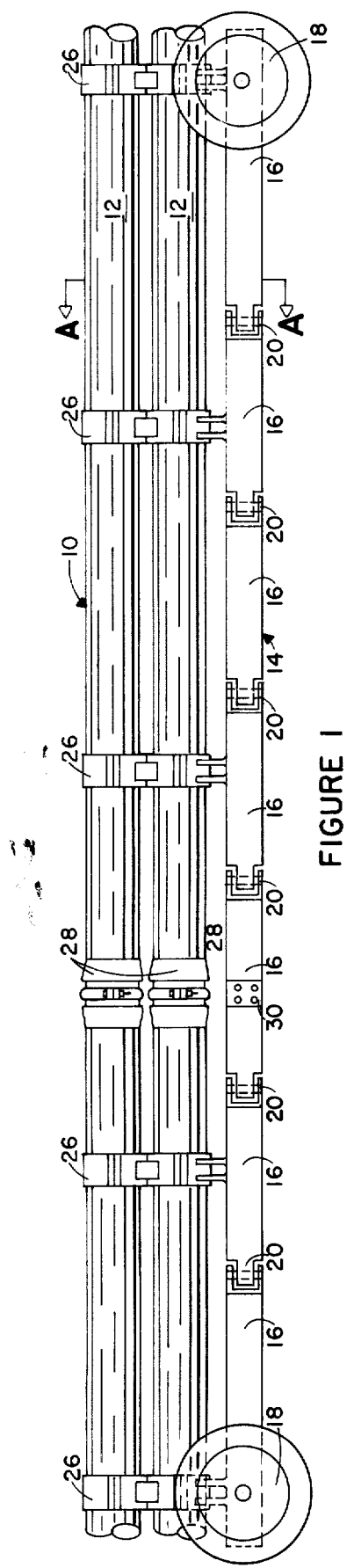
FIG. 1 shows a section of a slurry hose conveying vehicle including a linkage.
Figure 3:
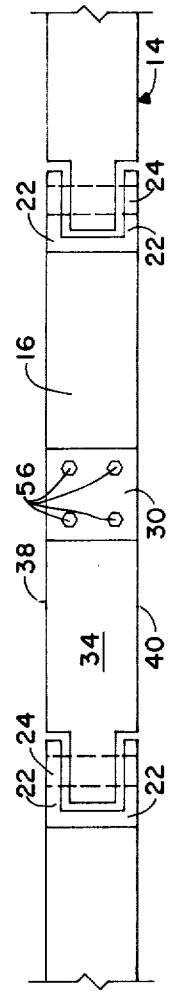
FIG. 3 is a side view of a link member including a union.

Referring to all the drawings and in particular to FIG. 1, a hose hauling system 10 is shown. A pair of hoses 12 are positioned over a linkage means 14. Linkage 14 includes a plurality of link members 16 which are pivotally connected together and to support members 18 shown herein as wheels. A plurality of pivotal connections 20 is utilized in forming linkage 14. Pivotal connections 20 comprise joining members 22 which mate and are joined by pin 24 as shown in FIG. 3. Hose 12 is securely fastened to linkage 14 by a series of hose clamps 26. Hose joints 28 are shown positioned immediately above a union means 30.

Figure 2:
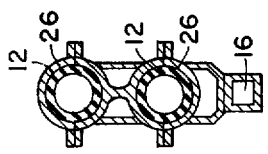
FIG. 2 is a cross-sectional view of the apparatus of FIG. 1 taken at Section A—A.

FIG. 2 is a cross-sectional view of the apparatus of FIG. 1 taken at Section A—A more clearly showing the location of hoses 12 and hose clamps 26 relative to linkage 14. Link member 16 is shown as a hollow member having a square cross section. Link members 16 are suitably hollow members or solid members of a variety of configurations, although members having square or rectangular cross-sections are preferred.

With reference to FIG. 3 a link member 16 is shown in position in a linkage 14. Link member 16 includes a union means 30 which is more fully described hereinafter with reference to FIG. 4.

Figure 4:
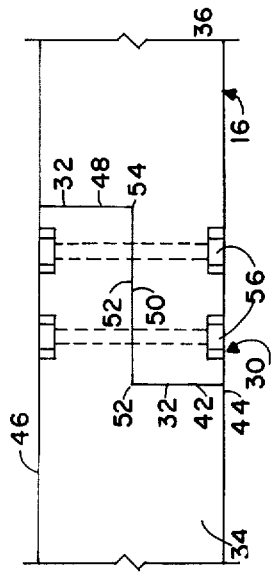
FIG. 4 is a top view of the link shown in FIG. 3.

FIG. 4 is a top view of link member 16 shown in FIG. 3. Union means 30 comprises a plurality of mating surfaces 32. Link member 16 comprises a first portion 34 and a second portion 36. Mating surfaces 32 are positioned perpendicularly to an upper side 38 of first portion 34 and a lower side 40 of first portion 34, although mating surfaces 32 may be at an angle up to about 30° from perpendicular and of irregular configurations for ease in mating, etc. Mating surfaces 32 comprise a first surface 42 which begins at a first side 44 of first portion 34 and extends toward a second side 46 of first portion 34. A second surface 48 is positioned on said first portion beginning at second side 46 of the first portion 34 and extending toward first side 44 of first portion 34. A third surface 50 is positioned to join the innermost extension 52 of first surface 42 and the innermost extension 54 of second surface 48. Mating surfaces are positioned on second portion 36 of linkage member 16. Mating surfaces 32 are then joined by fastening means 56 shown herein as bolts.

Figure 5:
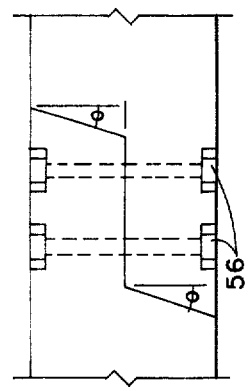
FIG. 5 represents a further embodiment of the union of the present invention.

FIG. 5 shows a further embodiment of the union means of the present invention wherein first surface 42 and second surface 48 are positioned at an angle which varies from about 10° to about 45°. In other respects the surfaces shown in FIG. 5 are similar to those shown in FIG. 4.

Figure 6:
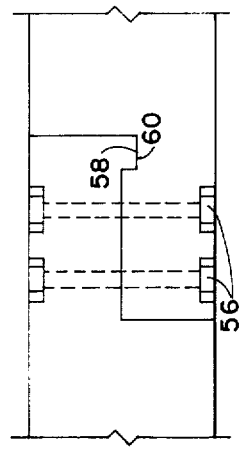
FIG. 6 represents a further embodiment of the union of the present invention.

In FIG. 6 a further embodiment of the union means of the present invention is shown. The mating surfaces are similar to those shown in FIG. 4; however, a lip 58 on first portion 34 has been positioned to matingly join a slot 60 on second portion 36.

In the operation of the union means of the present invention it is clear that by loosening bolts 56, linkage member 16 is readily disassembled to allow access as for instance to hose joint 28 of FIG. 1. In the operation of hose hauling systems such as shown in FIG. 1 difficulties arise in disassembling linkage 14. The pivotal connections 20 are of necessity formed to rather close tolerances in order to preserve the strength and rigidity of linkage 14. As a result, pins 24 are difficult to remove. This difficulty is further aggravated by the fact that hoses 12 are mounted directly above linkage 14 in many instances. It is thus necessary to remove hose 12 to remove pins 24. This is clearly an undesirable situation and the undesirability is increased by the fact that it is difficult to remove such closely toleranced pins after long periods of use especially in corrosive environments and in addition it is likely that the mating surfaces will be damaged by repeated disassembly and reassembly. Accordingly, a method was sought whereby linkage 14 could be disassembled without removing pins 24.

The means of the present invention achieves this objective by permitting the removal of bolts 56 from the side of linkage 14 thus permitting the disassembly of linkage 14 without removing hoses 12, pins 24, and the like. It is particularly desirable that a union such as described hereinbefore be included beneath hose joints 28. As noted hereinbefore, in the operation of the present invention bolts 56 are loosened and first portion 34 and second portion 36 separated from each other in a direction perpendicular to the longitudinal axis of hoses 12 to disassemble linkage 14. Such separations are readily accomplished and permit rapid and efficient reassembly with no substantial loss in the strength of linkage 14.

The foregoing description of embodiments is illustrative in nature rather than limiting and many variations and modifications in the union means of the present invention are possible and may be considered obvious or desirable to those skilled in the art upon a review of the foregoing description of embodiments.

Having thus described the invention, I claim:

1. In a system comprising a flexible tubular means for conveying a slurry, a plurality of moveable support means to support said tubular means, a linkage means interconnecting said moveable support means, said linkage means comprising a plurality of link members having connecting means at each end and pivotally connected together and to said support members and means for securing said tubular means to said linkage means, an improvement comprising positioning in said linkage means at least one link member having a union means for breaking and rejoining said linkage means positioned between a first and a second end of said link member.

2. The improvement of claim 1 wherein said union means comprises mating surfaces positioned on a first portion and a second portion of said link member, said surfaces positioned on said first portion being substantially perpendicular to the upper and lower sides of said first portion and comprising a first surface beginning at a first side of said first portion and extending toward a second side of said first portion, a second surface beginning at said second side and extending toward said first side and a third surface joining the innermost extensions of said first and said second surfaces; said surfaces on said second portion being formed to matingly join said surfaces on said first portion; and, at least one fastening means is used to join said first and said second portions.

* * * * *